March 26, 1963 R. H. SKIDMORE 3,082,816
PROCESS FOR TREATING MATERIAL
Filed Dec. 28, 1959 2 Sheets-Sheet 2
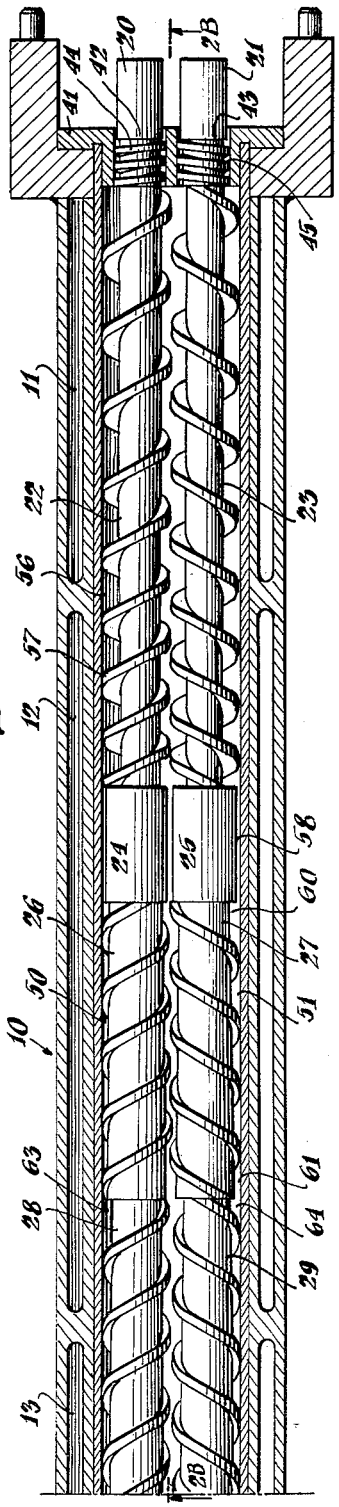
INVENTOR
Richard H. Skidmore
BY
Frank A. Bower
ATTORNEY United States Patent Office 3,082,816
Patented Mar. 26, 1963

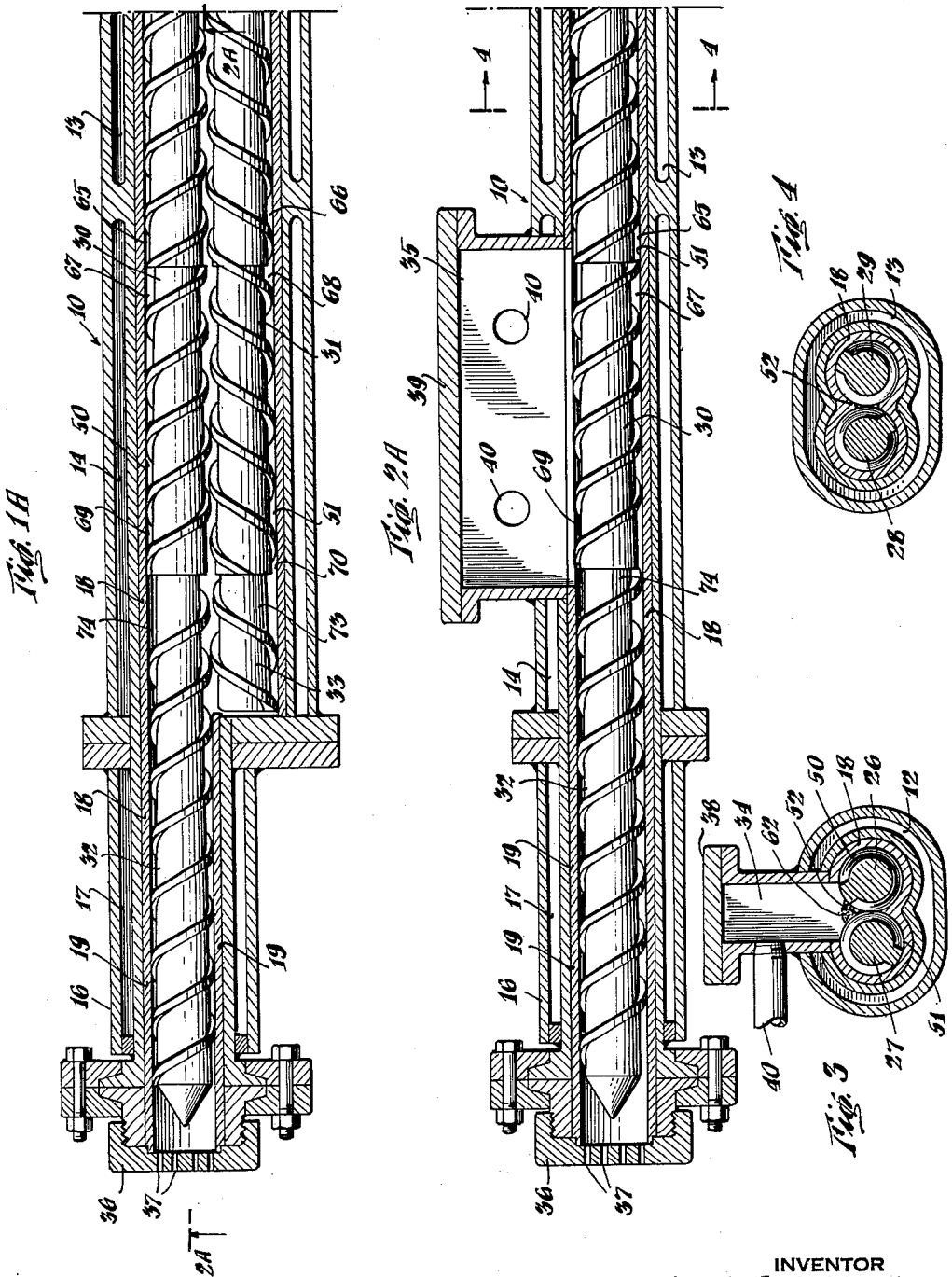

3,082,816
PROCESS FOR TREATING MATERIAL
Richard H. Skidmore, Strafford, Pa., assignor to Welding Engineers, Inc., Norristown, Pa., a corporation of Delaware
Filed Dec. 28, 1959, Ser. No. 862,310
9 Claims. (Cl. 159—49)

This invention relates to the treatment of viscous and plastic flowable materials and the removal of volatiles therefrom.

It further relates to an improvement in the continuous process of extracting volatiles by evaporation, by the reheating of the flowable process material intermediate between two stages of flashing off or evaporating of the volatiles from the treated mass. This application is a continuation-in-part of my co-pending application Serial No. 510,819, filed May 18, 1955, now abandoned.

A further object of the invention is to provide a process for the continuous removal of volatiles from a liquid or other extrudable material in relatively large amounts not previously possible by extrusion.

A further object of the invention is to provide a process for the continuous removal of volatiles from a plastic or rubber material while kneading and working the material to deliver a finished product of more uniform and better quality than possible by means previously known.

A further object of the invention is to provide a process for the continuous removal of a volatile from a plastic or rubber material and the recapture of the volatiles in a relatively pure condition permitting their reuse with little or no reprocessing.

A further object of this invention is to provide a process for an improved method of distillation for the removal and recovery of volatiles from a fluid or other extrudable material.

Further objects of this invention will become apparent from the following specification considered in conjunction with the attached drawings in which:

FIG. 1A is a horizontal sectional view of the front portion of apparatus embodying the invention;

FIG. 1B is a similar view of a rear portion of the apparatus illustrated in FIG. 1A;

FIG. 2A is a vertical sectional view on the line 2A—2A of FIG. 1A;

FIG. 2B is a vertical sectional view on the line 2B—2B of FIG. 1B;

FIG. 3 is a transverse sectional view through line 3—3 of FIG. 2B; and

FIG. 4 is a transverse sectional view taken on line 4—4 of FIG. 2A.

In the embodiment illustrated in FIG. 1A and 1B, the double-barreled portion is designated generally at 10 divided into successive jacketed sections 11, 12, 13 and 14 leading to the single barrel portion 16 also jacketed at 17 in one or more zones as desired. Within the barrels, replaceable liners 18, 19 are used to provide a surface to resist wear or chemical reaction. Rotary members 20, 21 turning in opposite directions operate within the barrel housing with a close running clearance in the bores 50, 51 of the casing, and are composed of feed portions 22, 23, rotary resistors 24, 25, primary milling rotary portions 26, 27, transfer and reheating portions 28, 29, secondary milling rotary portions 30, 31 and extrusion portions 32, 33. The barrel at the entrance end is provided with a feed hopper opening 15, primary extraction portion 34, secondary extraction portion 35 and die 36 provided with discharge orifices 37. Extraction portions 34, 35 are enclosed over the top with covers 38, 39 and outlet passages 40 are provided for removal of vapors to a vacuum creating system (not shown). Seal blocks 41 are mounted around the respective worm hubs 42, 43, and grooves 44, 45 are provided to act as a sealing means to prevent leakage from the machine. Of course, other appropriate sealing means could be provided. Feed hopper 15 is provided with a pressure tight cover 46 through which material feed inlet 47 extends as well as pressure line 48.

The bores 50, 51 in the replaceable liner 18 of the double barrel are of the same diameter and tangent at their center line, and an opening 52 is provided through the length of the double barrel portion interconnecting the twin bores 50, 51.

In the operation of the unit illustrated, the process material is introduced as a liquid through line 47 and preferably flows into the reservoir of material 54 leaving a vapor area 55 above its surface in which area, if desired, a pressure may be maintained as by introducing an inert gas or other substance through line 48. As the feed worms 22, 23 rotate in opposite directions and turn downward toward each other when viewed from above, as in FIG. 1A, they tend to advance the material continuously from the feed hopper in a downstream direction along the machine. Liquids are advanced at slow rates and under rather low pressures by a non-positive frictional device of the type illustrated when a severe restriction is used. Since materials suitable for treatment in this apparatus will often be introduced in the form of a liquid which will be advanced with relative difficulty through the feed portion of the machine, a pressure maintained in area 55 is an aid in moving the material forward and controlling its rate of flow. In the design of the feed portion 22, 23 of the worms it has been found that in the transmission of liquids a relatively deep flight space 56 with reducing pitch flight 57, as illustrated, is desirable as such a worm formation cooperates most advantageously with the pressure maintained in area 55. Other designs, for instance, with a constant pitch and decreasing depth of flight being shallow at the end away from the feed hopper, are relatively unresponsive and require relatively large changes in pressures at area 55 to have a significant influence on the material throughput. In the embodiment illustrated, satisfactory operation and control of throughput is maintained with pressures below 100 pounds per square inch. Under the forwarding pressure generated under worm portions 22, 23 and the pressure maintained in area 55, the processed material is forced generally axially as a confined helical ribbon through the close clearance 58 existing between rotary resistors 24, 25 and the bores 50, 51 of the liners, which form a zone of restriction. Where the materials processed are sufficiently viscous, the mechanical working they are subjected to in this operation will raise the temperature of the process material, and it will enter the first solvent evaporation area 34 at a higher temperature than it was fed to the machine. If this temperature is not sufficient for satisfactory operation, the material can be preheated prior to being fed through line 47 to hopper 15, or the jacketing zones 11, 12 can also be used to control the temperature of the material. The principal benefits from the application of pressure on the feed hopper are two fold: (1) If the feed material is of low viscosity, it is desirable to use a high resistance compounding worm having a close clearance in order to substantially increase the amount of heat in the fluid before entry into the first solvent evaporation section. This increased resistance then requires an increase in the pressure at the end of the feed worm which can be accomplished by feeding the process material under pressure or increasing the length of the feed worm. (2) Unless the material is under pressure, the temperature which can be obtained in the feed area will be limited to the boiling point of the volatile ingredient at atmospheric pressure since at this point vapors will be formed not only prohibiting further temperature rise but also decreasing the mass which can be forwarded by these worms. By generating a pressure on the material the boiling point of the volatiles is raised and then the feed temperature may be raised.

As the material enters extraction zone 34, which may be at a pressure below atmospheric due to the vacuum system attached to that area through line 40, a first solvent evaporation region, which extends along the material surface, becomes exposed to the extraction zone 34, and the material is rotated, worked and mixed by rotary milling portions, 26, 27 which advance it along the zone at the same time that it is being worked. The first solvent evaporation region is located downstream of the zone of restriction formed in the feed section. The milling action of these rotary members 26, 27 serves to break vapor bubbles repeatedly when they are formed permitting the vapors to escape into chamber 34 and be drown off through line 40. The mixing of the material that takes place through the kneading action of the worm constantly exposes new surfaces of the process material to the vacuum and maintains a relatively uniform temperature throughout the material and uniform consistency. This mechanical heat generated in the material by this kneading action helps replace the latent heat lost by vaporizing the volatile constituent, thus continuing vaporizing throughout the length of the worm.

In the apparatus shown the bore diameter is two inches and the form flight depth 60 of the rotary members 26, 27 may be in the order of $3/16''$ to $1/8''$ at the rear end where the material first enters extraction chamber 34 and is worked by the rotary members. The most rapid removal of volatiles takes place at this point. The rate of removal generally decreases as the material is being forwarded while being worked. The worm flight depth 61 toward the forward end of these worms in chamber 34 will usually be somewhat less and the frothing or bubbling of the material usually decreases after the first quantity of volatiles is removed and a shallower depth 61 is desirable at this point. In the preferred operation, a bank 62 (FIG. 3) of material is maintained on the center line between the two rotary members. This assures that the worm flight spaces 60, 61 will be filled with material and there will be a constant interchange of material. The length of primary extraction chamber 34 may be varied depending upon the material being processed and the operation desired and this will be greatly influenced by the amount of volatiles removed. As the material progresses down this section 34, the volatile content of the material continually decreases resulting in a corresponding increase in viscosity. As the viscosity increases, the ease with which mechanical energy can be transferred into the mass improves greatly so that it can then be applied more efficiently in a closed reheat section.

This reduction of boiling in the extraction chamber may occur before sufficient volatiles have been removed, and in that case the material must have its temperature raised, as by reheating, to stimulate active discharge of volatiles. As the material approaches the front end of chamber 34, it drops into flight spaces 63, 64 of rotary transfer and reheat members 28, 29 located downstream of the first solvent evaporation region. These worms draw the material downstream. Due to the elimination of a considerable portion of the volatiles from the process material in its passage through extraction chamber 34, the material is considerably more viscous by the time it is received by rotary members 28, 29 than it was when fed into hopper 15. When seized by rotary members 28, 29 it is sufficiently viscous for a non-positive extrusion device to advance it forward. The depth of the flight spaces on rotary members 28, 29 which may be $3/16''$ deep at the rear end, decreases in the direction of the flow of the material and the flight spaces 65, 66 at the front end of these members are considerably shallower, something in the order of $1/16''$ depth, than the flight spaces 63, 64 at the rear end. These shallow flight spaces 65, 66 serve to offer some slowing down of the advance of the material and by performing mechanical work on the material raise the temperature while still advancing it in a downstream direction while forming a second zone of restriction and ejecting it onto rotary members 30, 31 in the secondary extraction chamber 35. In addition, this type of worm design permits vapor release by relative increase in surface area to continue throughout the rear portion of this section. Additionally this extreme variation in depth permits the unit to operate at a wider range of production rates and still get the benefit of reheating.

The reheated material is then seized by rotary members 30, 31 which work and knead it in its passage through the secondary chamber which, as shown, is located generally above the second solvent evaporation region which extends along the surface of the material, downstream of the second zone of restriction.

There is less frothing and bubbling of the material in this chamber as a large part of the volatiles has already been removed, and the worm flight spaces 67, 68 at the rear of rotary members 30, 31 will usually be somewhat shallower than the flight depth 60 at the rear of rotary members 26, 27. Rotary members 30, 31 will also usually decrease in flight space depth and this space 69, 70 at the front end of this member will be shallower than the depth 67, 68 at the rear end. In this portion also it is desirable to have a bank of material between the two rotary members, such as bank 62 in the primary extraction zone. It has been found that the secondary extraction zone may be varied in length according to the material being processed.

The correct reheating treatment given by rotary members 28, 29 may permit the length of the secondary extraction opening 35 to be relatively short, for instance, as short as the worm diameter whereas with insufficient heating a length of even eight diameters may be required. The devolatilizing is completed to the desired point in the secondary extracting portion and as the material passes beyond rotary members 30, 31, it drops into the flight spaces 73, 74 of extrusion members 32, 33 and is seized and fed forward. The material which is accepted by rotary member 33 is transferred to rotary member 32 through the longitudinal opening 52 and is seized by the rotary member 32 which then advances the processed material forward and ejects it through die orifices 37.

The clearance 58 or the design of resistor members 24, 25, as well as the design of the helical flight rotary members 22, 23 and the pressure maintained in area 55, is adjusted to feed the appropriate quantity of the material under the proper temperature and pressure into the extraction area 34. Further, the length of the extraction openings may be modified as desired without departing from the principle of this invention but the length of the first solvent evaporation region, extending along the screw length and in vapor communication with the solvent removal means, is at least a plurality of turns of the helical ribbon. The design of the mechanism must be such that the process material completely fills the clearance space 58 surrounding the rotary resistors 24, 25 so that a vacuum-tight seal is created between feed hopper 15 and extraction chamber 34. In like manner, a seal is developed in flight spaces 65, 66 so that a vacuum-tight seal is generated between primary extraction chamber 34 and secondary extraction chamber 35. The sealing members wherever required may be (1) a smooth cylinder, as illustrated by rotary resistors 24, 25; (2) a shallow flighted forward lead worm which, of course, must be run full and with the polymer under sufficient pressure to effect a seal as illustrated by 65, 66; or (3) other rotary resistors known to the art, such as a reverse flighted worm. Accordingly, the "solvent evaporation regions," referred to herein, normally extend from one such seal to the next.

Where reference is made herein to the "first solvent evaporation region" and to the "second solvent evaporation region," it will be appreciated that these regions as shown in the drawings are continuous portions extending along the screw length which are in vapor communication with a solvent removal means. Obviously the lengths of such regions are not dependent on the diameter of either vacuum opening 40 or upon the specific structure or extent of either chamber 34 or 35, but depend upon the length of the continuous free space along the worm flight through which the solvent in the material can be subjected to evaporation.

In this way the output of the unit can be maintained independent of the other operating variables on the unit which might alter the viscous behavior of the process material. With many materials the amount of heat which may be transferred to the process material in the feed worms 22, 23 may be limited by the boiling point. This point can be raised by subjecting this material to pressure. The extrusion of the material by rotary member 32 through die 36 provides a vacuum-tight seal at the die, thus preventing a leakage of air backward into extraction area 35.

It should be further understood that in some cases a substitutable feed method might be desired, introducing the process material through line 47 under pressure from a pump, thus eliminating the need for a vapor pressure to be introduced through line 48. If the material were introduced under pressure by a pump, the throughput would be controlled by the output of this pump, not shown.

The volatiles drawn off through line 40 to the vacuum system may be condensed and reclaimed. They can then be reused and thus no material is lost.

Additional reheating zones and solvent evaporation regions may be added without departing from the nature of this invention.

It is to be understood that the vapor velocity at the release areas and the distribution of the relative proportion of volatile removal in each release area may be controlled by the independent regulation of the partial pressures at each release area, the principal control usually occurring at the first release area. This method has the advantage of reducing the polymer fines entrainment in the moving vapors by raising the absolute pressure at the point of vapor evaporation as well as resulting in a higher condensing temperature for the reclaiming of the vapor removed in this upstream area.

In this continuous process for treatment of material, many limitations in the previous art have been overcome. Outstanding among these prior difficulties is the fact that where large quantities of volatiles need to be removed, the temperature of the mass being treated would fall through the absorption by the volatile material of heat of vaporization, and the temperature of the mass would drop to the point where additional vaporization of volatiles took place at a very slow rate. Further, when feeding a mixture of a plastic material and a solvent, which enters the apparatus as a viscous liquid, difficulty was experienced in handling this relatively liquid feed material at properly controlled rates in the same type of continuous apparatus suitable for the devolatilizing and final extrusion of the finished material.

When treating material in a large batch, the following difficulties are encountered:

(1) It is difficult to maintain high rates of heat transfer without overheating the material because the material being heated usually has poor heat transfer and is usually of high viscosity making convection or mixing difficult. The poor heat transfer is especially objectionable if an exothermic or an endothermic chemical reaction is taking place during the processing.

(2) The rate of bubble formation is slow and its rate of travel through the viscous mass is also slow.

(3) It is difficult to keep the material stirred sufficiently in order to present new material to the evaporating surface.

(4) When a large volume of material is treated in a batch, uniform temperature and treatment of the material cannot be maintained, which results in nonuniform quality of the product.

(5) When treating heat sensitive materials, the temperature limitations discussed above further limit the operating capacity of equipment.

The difficulties in processing material in batch operation are overcome due to the fact that in the present invention a relatively small amount of material is under treatment at any given moment and it is being thoroughly intermixed at all times. Thus, the temperature throughout the mass is relatively uniform and the distance from any given point within the mass to the evaporating surface in the evaporating area is short, and continually new surfaces are being exposed in the evaporating area. If the feed material is sufficiently viscous so that it can be satisfactorily advanced by the feed portion of the worms, then the enclosed feed hopper otherwise held under pressure may be left open and the material simply dropped into the worms. The extraction operation will take place as described above with the length of the extraction openings and adjustment of operating conditions made to suit the processing of the particular material being treated.

It should, of course, be understood that materials can be polymerized to 85% completion or 95% completion and, if this produces a material which is granular at atmospheric temperature, this can then be fed to the hopper of the machine as a solid in place of the liquid process material discussed above. In such a case, the material will be fed by means known to the art and the design of rotary members 22, 23 and 24, 25 will be adjusted to fuse and heat up such material as it is desired to process.

The monomer-polymer composition through a wide range of relative proportions in the initial mixture or solution is efficiently treated and reduced as desired in monomer content. For example, a monomer of vinyl type might be treated to the point where a solution containing 30% polymer and 70% monomer is introduced for treatment into the apparatus of the invention, or the polymerization might be carried further so that a solution containing 60% polymer and 40% monomer could be introduced for treatment. With many types of plastics, mixtures throughout the above range still maintain a liquid character at atmospheric temperatures although viscosity would rise with polymer content.

The present invention by effectively and economically removing monomers or solvents in large quantities has thus opened up the possibility of a new system in the manufacture of thermoplastic polymers and their like. Instead of the polymerization chemist having to meet the requirement of polymerizing the material completely or almost completely, he can now select practically any percent of polymerization which fits in with his quality requirements and through the use of this flexible process develop qualities in the materials that were previously impossible. In many cases according to the system of this invention, it is most desirable to discontinue the polymerization while the solution is still in a liquid state, but if desired it could be carried further until the material reached a solid state which might be such that 85% polymer was present with 15% monomer.

Below are listed examples of the application of this process—

Example 1

Feed composition—50% styrene type thermoplastic polymer with 50% monomer
Feed temperature—110° C. (10° above monomer boiling point at atmospheric pressure)
Feed method—20 p.s.i.a. pressure from external source
Worm diameter—6″
Length of feed section—61″
Length of first evaporation section—48″, rectangular
Length of reheat section—45″
Length of second evaporation section—36″, rectangular
Length of extrusion section—46″
Pressure at evaporation areas:
    First—20 mm. Hg absolute
    Second—10 mm. Hg absolute
Worm r.p.m.—150
Barrel temperature—200° C.
Residence time—4.3 minutes
Rate—800 pounds per hour
Horsepower—150
End material—99.7% polymer, 3% monomer

Example 2

Feed composition—styrene type thermoplastic polymer containing 2% total volatiles (including high boilers)
Feed temperature—200° C.
Feed method—pressure from external source
Worm diameter—4.5″
Length of feed section—48.5″
Length of first evaporation area—27″, rectangular
Length of reheat section—50″
Length of second evaporation area—4.5″, circular
Length of extrusion section—35″
Pressure at evaporation areas—both 10 mm. Hg absolute
Worm r.p.m.—150
Barrel temperature—200° C.
Residence time—1.1 minutes
Rate—550 pounds per hour
Horsepower—90
End material—99.6% polymer

Example 3

Feed composition—25% elastomer dissolved in 75% hydrocarbon solvent
Feed temperature—85° C. (30° above hydrocarbon boiling point at atmospheric pressure)
Feed method—75 p.s.i.a. pressure from external source
Worm diameter—2″
Length of feed section—21.5″
Length of first evaporation section—12″, rectangular
Length of reheat section—12″
Length of second evaporation section—12″, rectangular
Length of extrusion section—16″
Pressure at evaporation areas:
    First—20 p.s.i.a.
    Second—50 m. Hg absolute
Solvent removal at evaporation areas:
    First—70%
    Second—30%
Worm r.p.m.—150
Barrel temperature—225° C.
Residence time—1.5 minutes
Rate—100 pounds per hour
Horsepower—10
End material—99% elastomer, 1% solvent While the invention has been described particularly in the processing of polymer-monomer material, it is not confined thereto. The system may be applied generally to solvent and liquid removal, and other volatiles such as water from synthetic rubber.

I claim:

1. A process for removal of a relatively volatile ingredient from flowable composition comprising (1) continuously feeding said composition in a downstream direction and forcing and passing it into confined helical ribbon formation under pressure and predetermined temperature conditions with axial progress of said ribbon and passing it on to a first zone of restriction acting to maintain pressure on the said composition as it passes through said zone of restriction, (2) discharging the said composition into a first solvent evaporation region located downstream of and of lower pressure than said zone of restriction, said region having an axial extent of at least a plurality of turns of said helical ribbon, and progressively mixing the said composition and exposing new surfaces of said composition to said lower pressure and releasing and removing volatiles from said composition continuously as the depleting composition passes through said first solvent evaporation region, (3) passing the depleted composition form said first solvent evaporation region and confining said depleted composition in a second zone of restriction under pressure, mechanically working said composition in said second zone of restriction in a manner to develop heat in said composition while maintaining said composition in the form of a pressure seal, (4) discharging the resulting composition from said second zone of restriction into a second solvent evaporation region located downstream of, and of lower pressure than said second zone of restriction, said second solvent evaporation region having an axial extent of at least a plurality of turns of said helical ribbon, and progressively mixing the said depleted composition and exposing new surfaces of the further depleting composition to said decreased pressure and releasing further volatiles from said further depleting composition continuously as it passes through said second solvent evaporation region, said first zone of restriction forming a pressure seal upstream of said first solvent evaporation region and said second zone of restriction forming a pressure seal between said first and second solvent evaporation regions, and (5) passing the further depleted composition from said second solvent evaporation region and discharging it under pressure.

2. A process as set forth in claim 1 for removal of a relatively volatile ingredient, in which the composition is under initial supply pressure at its entrance to the confining and feeding operation, which pressure is of a magnitude that prevents the boiling of the volatile ingredients.

3. A process as set forth in claim 1 for removal of a relatively volatile ingredient, in which the entering composition is polymerized to a predetermined point short of completion to give a definite proportion of monomer and polymer.

4. A process as set forth in claim 1 for removal of a relatively volatile ingredient, in which the temperature of the composition during at least one step in its processing is modified by the transfer of heat between the composition and a heat transfer medium external thereto.

5. A process as set forth in claim 1 wherein the depleted composition is simultaneously mixed and heated in said second zone of restriction.

6. A process as set forth in claim 1 for removal of a relatively volatile ingredient, in which the pressure in the first solvent evaporation region is different from the pressure in the second solvent evaporation region.

7. A process for removal of a relatively volatile ingredient from flowable composition comprising (1) continuously feeding said composition in a downstream direction and forcing and passing it into confined helical ribbon formation under pressure and predetermined temperature conditions with axial progress of said composition through a first zone of restriction wherein the composition fills the confining space under the maintained pressure to prevent the flow of vapors therethrough, (2) discharging the said composition into a first solvent evaporation region located downstream of, and of lower pressure than said zone of restriction, said region having an axial extent of at least a plurality of turns of said helical ribbon, and progressively mixing the said composition and exposing new surfaces of said composition to said lower pressure and releasing and removing volatiles from said composition continuously as the depleting composition passes through said first solvent evaporation region, (3) passing the depleted composition from said first solvent evaporation region and confining said depleted composition in helical ribbon formation in a second zone of restriction under pressure, (4) discharging the resulting composition from said second zone of restriction into a second solvent evaporation region located downstream of, and of lower pressure than said second zone of restriction, said second solvent evaporation region having an axial extent of at least a plurality of turns of said helical ribbon, and progressively mixing the said depleted composition and exposing new surfaces of the further depleting composition to said decreased pressure and releasing further volatiles from said further depleting composition continuously as it passes through said second solvent evaporation region, said second zone of restriction forming a pressure seal between said first and second solvent evaporation regions, and (5) passing the further depleted composition under pressure from said second solvent evaporation region and discharging it under pressure.

8. A process as set forth in claim 1 for removal of a relatively volatile ingredient, in which the composition in passing through at least one solvent evaporation region is at least in part in helical ribbon formation which decreases in thickness in the downstream direction.

9. A process for removal of a relatively volatile ingredient from a flowable composition comprising continuously confining and feeding said flowable composition in a downstream direction from a supply in a confined helical ribbon formation through a first zone of restriction which maintains pressure on the said composition to form a vapor seal at said restriction, and discharging said composition through said seal into a first solvent evaporation region located downstream of and of lower pressure than said zone of restriction for the evaporation of volatiles from the composition while passing it therethrough, said region having an axial extent of at least a plurality of turns of said helical ribbon, discharging the depleted composition from said first solvent evaporation region, and feeding said depleted composition under pressure into a second zone of restriction in a substantially helical ribbon formation axially moving and in transverse confinement, mechanically working said composition in said second zone of restriction in a manner to develop heat in said composition while maintaining said composition in the form of a pressure seal, and passing it into a second solvent evaporation region, said second solvent evaporation region having an axial extent of at least a plurality of turns of said helical ribbon and having a pressure lower than the pressure in said second zone of restriction for the further evaporation of volatiles and passing the further depleting composition therethrough, said first zone of restriction forming a pressure seal upstream of said first solvent evaporation and said second zone of restriction forming a pressure seal between said first and second solvent evaporation zones, discharging the further depleted composition from said second solvent evaporation region and feeding it under pressure and substantially in helical ribbon formation and transverse confinement through to the discharge.

References Cited in the file of this patent

UNITED STATES PATENTS

| Re. 23,948 | Fuller | Feb. 15, 1955 |
| 1,156,096 | Price | Oct. 12, 1915 |
| 2,549,400 | Tornberg | Apr. 17, 1951 |
| 2,615,199 | Fuller | Oct. 28, 1952 |
| 2,719,325 | Franklin | Oct. 4, 1955 |
| 2,992,679 | Twaddle | July 18, 1961 |